(12) United States Patent
Berger et al.

(10) Patent No.: US 10,379,776 B2
(45) Date of Patent: Aug. 13, 2019

(54) OPERATION INTERLOCKING IN AN ADDRESS-SLICED CACHE SYSTEM

(71) Applicant: International Business Machines Corporation, Armonk, NY (US)

(72) Inventors: Deanna P. Berger, Hyde Park, NY (US); Michael A. Blake, Wappingers Falls, NY (US); Ashraf Elsharif, Austin, TX (US); Kenneth D. Klapproth, Travis, TX (US); Pak-kin Mak, Poughkeepsie, NY (US); Robert J. Sonnelitter, III, Wappingers Falls, NY (US); Guy G. Tracy, Austin, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 115 days.

(21) Appl. No.: 15/603,728

(22) Filed: May 24, 2017

(65) Prior Publication Data

US 2018/0341422 A1 Nov. 29, 2018

(51) Int. Cl.
*G06F 12/00* (2006.01)
*G06F 3/06* (2006.01)
(Continued)

(52) U.S. Cl.
CPC .......... *G06F 3/0647* (2013.01); *G06F 3/0604* (2013.01); *G06F 3/0644* (2013.01);
(Continued)

(58) Field of Classification Search
CPC .... G06F 3/0647; G06F 3/0604; G06F 3/0644; G06F 3/0673; G06F 12/0842; G06F 12/0893; G06F 2212/60; G06F 2212/62
See application file for complete search history.

(56) References Cited

U.S. PATENT DOCUMENTS

| 8,443,163 | B1 | 5/2013 | Bailey et al. |
| 8,521,960 | B2 * | 8/2013 | Berger ................ G06F 12/0846 711/129 |

(Continued)

OTHER PUBLICATIONS

Zhang et al., "Dynamic Cache Pooling in 3D Multicore Processors," ACM Journal on Emerging Technologies in computing Systems, vol. 12, No. 2, Article 14, Pub. date: Aug. 2015, 21 pages.

*Primary Examiner* — David Yi
*Assistant Examiner* — Tahilba O Puche
(74) *Attorney, Agent, or Firm* — Cantor Colburn LLP; William Kinnaman

(57) ABSTRACT

An aspect includes interlocking operations in an address-sliced cache system. A computer-implemented method includes determining whether a dynamic memory relocation operation is in process in the address-sliced cache system. Based on determining that the dynamic memory relocation operation is in process, a key operation is serialized to maintain a sequenced order of completion of the key operation across a plurality of slices and pipes in the address-sliced cache system. Based on determining that the dynamic memory relocation operation is not in process, a plurality of key operation requests is allowed to launch across two or more of the slices and pipes in parallel in the address-sliced cache system while ensuring that only one instance of the key operations is in process across all of the slices and pipes at a same time.

11 Claims, 7 Drawing Sheets

(51) Int. Cl.
*G06F 12/0893* (2016.01)
*G06F 12/0842* (2016.01)

(52) U.S. Cl.
CPC ........ *G06F 3/0673* (2013.01); *G06F 12/0842* (2013.01); *G06F 12/0893* (2013.01); *G06F 2212/60* (2013.01); *G06F 2212/62* (2013.01)

(56) References Cited

U.S. PATENT DOCUMENTS

| | | |
|---|---|---|
| 8,886,909 B1 | 11/2014 | De Forest et al. |
| 8,924,681 B1 | 12/2014 | Throop et al. |
| 9,459,998 B2 * | 10/2016 | Blake ...................... G06F 12/02 |
| 2016/0139831 A1 | 5/2016 | Bronson et al. |

* cited by examiner

OPERATION INTERLOCKING IN AN ADDRESS-SLICED CACHE SYSTEM

BACKGROUND

The present invention generally relates to computer memory systems, and more specifically, to operation interlocking in an address-sliced cache system.

In shared cache designs which support a high number of operations from a large number of processors, caches are often sliced by system address index bits to maintain adequate throughput. These address-based cache slices, or cache pipes, are usually assigned on consecutive cache line addresses and perform cache-related operations autonomously as coherency management across the caches and memory can be performed on the cache line size basis.

In certain systems, when a processor accesses a unit of data from storage, cache line data is returned with a key value associated with a page from which the cache line data was fetched. The returned key is then checked against the key assigned to a program or user to determine if the access is in violation or is permitted before continuing with program execution. With systems supporting up to multiple terabytes of memory, the amount of keys needed can be up to gigabytes of capacity, beyond the capacity of processor caches. Therefore, in certain systems, the keys are physically located in a reserved region of system memory where the page data resides, and the keys are accessed in conjunction with the data.

SUMMARY

Embodiments of the present invention are directed to a computer-implemented method for interlocking operations in an address-sliced cache system. A non-limiting example of the computer-implemented method includes determining whether a dynamic memory relocation operation is in process in the address-sliced cache system. Based on determining that the dynamic memory relocation operation is in process, a key operation is serialized to maintain a sequenced order of completion of the key operation across a plurality of slices and pipes in the address-sliced cache system. Based on determining that the dynamic memory relocation operation is not in process, a plurality of key operation requests is allowed to launch across two or more of the slices and pipes in parallel in the address-sliced cache system while ensuring that only one instance of the key operation is in process across all of the slices and pipes at a same time.

Embodiments of the present invention are directed to a system for interlocking operations in an address-sliced cache system. A non-limiting example of the system includes a plurality of computer processor chips and a system controller coupled to the computer processor chips. The system is configured to determine whether a dynamic memory relocation operation is in process. Based on determining that the dynamic memory relocation operation is in process, the system serializes a key operation to maintain a sequenced order of completion of the key operation across a plurality of slices and pipes in the address-sliced cache system. Based on determining that the dynamic memory relocation operation is not in process, the system allows a plurality of key operation requests to launch across two or more of the slices and pipes in parallel in the address-sliced cache system while ensuring that only one instance of the key operation is in process across all of the slices and pipes at a same time.

Embodiments of the present invention are directed to a computer program product for interlocking operations in an address-sliced cache system, the computer program product including a computer readable storage medium having program instructions embodied therewith. In a non-limiting example, the program instructions are executable by processing circuitry to cause the processing circuitry to perform determining whether a dynamic memory relocation operation is in process in the address-sliced cache system. Based on determining that the dynamic memory relocation operation is in process, the program instructions cause the processing circuitry to serialize a key operation to maintain a sequenced order of completion of the key operation across a plurality of slices and pipes in the address-sliced cache system. Based on determining that the dynamic memory relocation operation is not in process, the program instructions cause the processing circuitry to allow a plurality of key operation requests to launch across two or more of the slices and pipes in parallel in the address-sliced cache system while ensuring that only one instance of the key operation is in process across all of the slices and pipes at a same time.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

Figure 1:
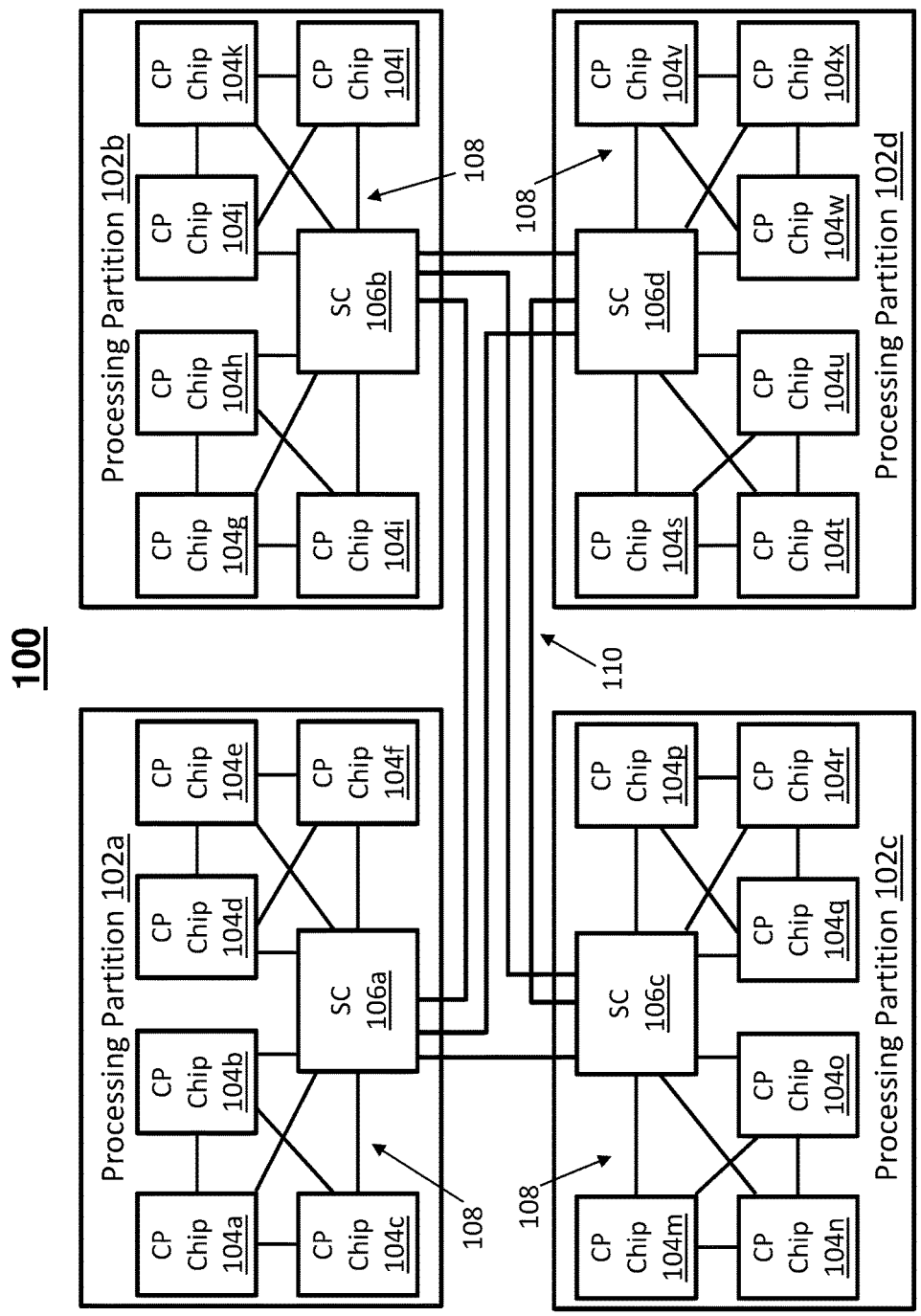
FIG. 1 depicts a system according to one or more embodiments.

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

In the accompanying figures and following detailed description of the disclosed embodiments, the various elements illustrated in the figures are provided with two or three digit reference numbers. With minor exceptions, the leftmost digit(s) of each reference number correspond to the figure in which its element is first illustrated.

DETAILED DESCRIPTION

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

Turning now to an overview of technologies that are more specifically relevant to aspects of the invention, implementing support for page-based key operations along with dynamic memory relocation (DMR), while ensuring proper key operation behavior and minimizing performance/hardware impact, poses unique challenges. DMR relocates data between memory locations while a program is still active to create more efficient memory storage. Since large cache subsystems are often sliced by a low-order address bit for physical packaging reasons (e.g., to reduce bus widths and complexity of intermediate points in the cache subsystem), this also complicates the design of an interlock between two operations that span all slices of the cache subsystem. Page-based key operations typically require serialization across slices/pipes of a design where the page spans a plurality of address-sliced pipelines. Without serialization across the slices, it is possible for a certain slice or pipe to complete its portion of a key update long before the other slices/pipes. Subsequent operations could then access and potentially update the cached key change bits on the faster pipeline and write them back to memory before the other pipelines have completed the key update operation, causing the updated change value from the access to be lost.

Turning now to an overview of the aspects of the invention, one or more embodiments of the invention address the above-described shortcomings of the prior art by providing interlocking key operations and DMR in an address-sliced multiprocessor cache. Rather than requiring that all key operations which span a plurality of address sliced pipelines always be serialized on one address slice, (i.e., a slice and pipe off-chip fabric request must be made, resources reserved and the request successfully responded to before the other slice/pipe requests can be made) regardless of whether or not a DMR operation was in progress. Previously, serialization meant that an off-chip fabric request must be made and responded to on the serialization slice/pipe before the other slice/pipe combinations could be allowed to issue off-chip fabric requests. This caused an increase in the overall latency of the multi-slice key operation due to off-chip round trip latency occurring in a serial manner.

The above-described aspects of the invention address the shortcomings of the prior art by providing interlocking key operations while performing the slice/pipe based off-chip request of the key operation serially if a DMR operation is also active in a system. The system can dynamically detect an ongoing DMR operation and serialize the key operation in such a scenario. If a DMR operation is not underway, off-chip requests of the key operation do not need to be serialized across the slice/pipe combinations, and a cache operation (e.g., level-3 (L3) cache) is allowed launch the key operation requests from various slices/pipes in any order. This allows off-chip fabric requests to occur in parallel while still ensuring that only one active key operation is in process across all of the slices/pipes at once. Technical effects and benefits include ensuring operations that span multiple address slices/pipes are processed in the same order across all slices/pipes without incurring the latency of a cross-fabric chip-to-chip request and response roundtrip to avoid serialization of operations while coordinating shared access.

Turning now to a more detailed description of aspects of the present invention, FIG. 1 depicts an example of an address-sliced cache system 100 according to embodiments of the invention. The address-sliced cache system 100 can be part of a processing complex and may include a plurality of processing partitions 102a, 102b, 102c, 102d. The processing partitions 102a-102d can be physical partitions, such as drawers, that separate various processing and control resources. In the example of FIG. 1, processing partition 102a includes a plurality of computer processor (CP) chips 104a, 104b, 104c, 104d, 104e, 104f. The CP chips 104a-104f can be partitioned into clusters on two or more separate buses 108 that interface with a system controller (SC) 106a that is shared by the CP chips 104a-104f. Similarly, processing partition 102b includes a plurality of CP chips 104g, 104h, 104i, 104j, 104k, 104l that can be partitioned into clusters on two or more separate buses 108 that interface with a SC 106b shared by the CP chips 104g-104l. Processing partition 102c includes a plurality of CP chips 104m, 104n, 104o, 104p, 104q, 104r that can be partitioned into clusters on two or more separate buses 108 that interface with a SC 106c shared by the CP chips 104m-104r. Processing partition 102d includes a plurality of CP chips 104s, 104t, 104u, 104v, 104w, 104x that can be partitioned into clusters on two or more separate buses 108 that interface with a SC 106d shared by the CP chips 104s-104x. SCs 106a-106d are interconnected by a communication fabric 110 that enables cross-bus movement between the CP chips 104a-104x and SCs 106a-106d of processing partitions 102a-102d.

Figure 2:
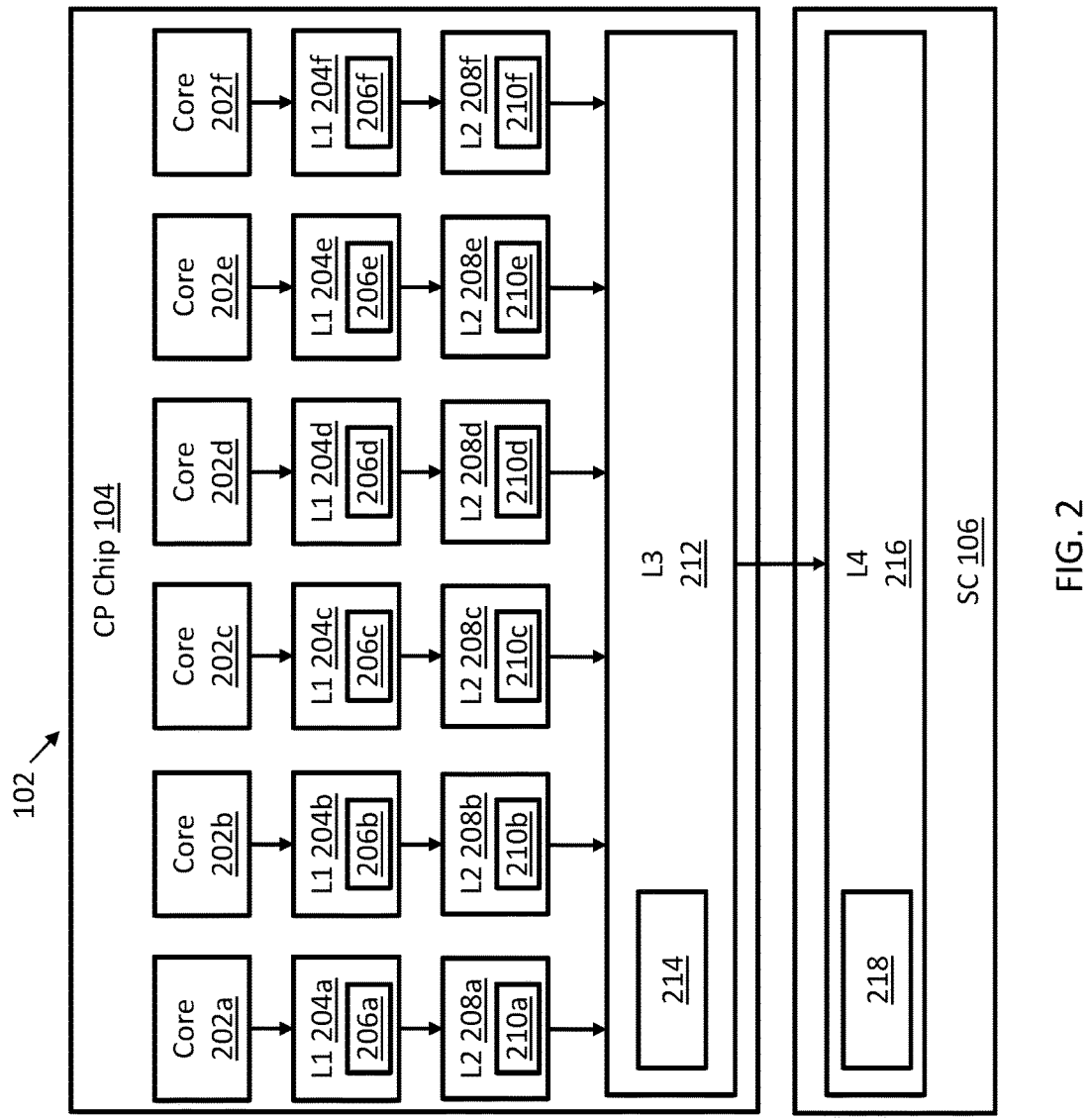
FIG. 2 depicts a cache hierarchy according to one or more embodiments.

Referring now to FIG. 2, each CP chip 104 of each processing partition 102, such as CP chip 104a in processing partition 102a of FIG. 1, includes one or more cores for the reading and executing of instructions. For example, and, in the embodiment shown in FIG. 2, CP chip 104 includes six cores 202a, 202b, 202c, 202d, 202e, and 202f. It should be understood that any number of cores may be included. Each core 202a-202f is operatively coupled to a level one (L1) cache, such as L1 caches 204a, 204b, 204c, 204d, 204e, and 206f; and a level two (L2) cache, such as L2 caches 208a, 208b, 208c, 208d, 208e, and 208f. For example, core 202a is operatively coupled to L1 cache 204a and to L2 cache 208a. Specifically, the L1 caches 204a-204f are respectively coupled to the cores 202a-202f, and the L2 caches 208a-208f are respectively coupled to the L1 caches 204a-204f. Each of L1 caches 204a-204f can include a respective L1 cache control, such as L1 cache controls 206a, 206b, 206c, 206d, 206e, and 206f. Each of the L2 caches 208a-208f can includes an L2 cache control, such as L2 cache controls 210a, 210b, 210c, 210d, 210e, and 210f. Each L2 cache 208a-208f is operatively coupled to a level three (L3) cache 212, such that one L3 cache 212 is included in each CP chip 104. Each L3 cache 212 is shared by multiple L2 caches 208a-208f. The L3 cache 212 also includes an L3 cache control 214.

Each level four (L4) cache 216 is shared by one or more L3 caches 212 from each CP chip 104 within the same processing partition 102. In this example, L4 cache 216 is shared by L3 cache 212 of CP chip 104. The L4 cache 216 can reside in or be coupled to SC 106, such as SC 106a of FIG. 1. Each L4 cache 216 can include an L4 cache control 218.

It should be understood that other cache sizes may be used as well. It should also be understood that although FIG. 2 illustrates a multi-level cache hierarchy having four levels of cache, any number of cache levels may be included in the address-sliced cache system 100 of FIG. 1. It should also be understood that while FIG. 2 illustrates the highest, or last, level cache as L4 cache, the highest level cache on the processing partitions 102a-102d of FIG. 1 may be a lower, or higher, cache level (for example, an L3 cache may be the highest level cache). Moreover, each processing partition 102a-102d of FIG. 1 may be configured with a different highest level cache such that one processing partition 102 has an L4 cache as its highest level cache and another processing partition 102 has an L3 cache as its highest level cache.

Figure 3:
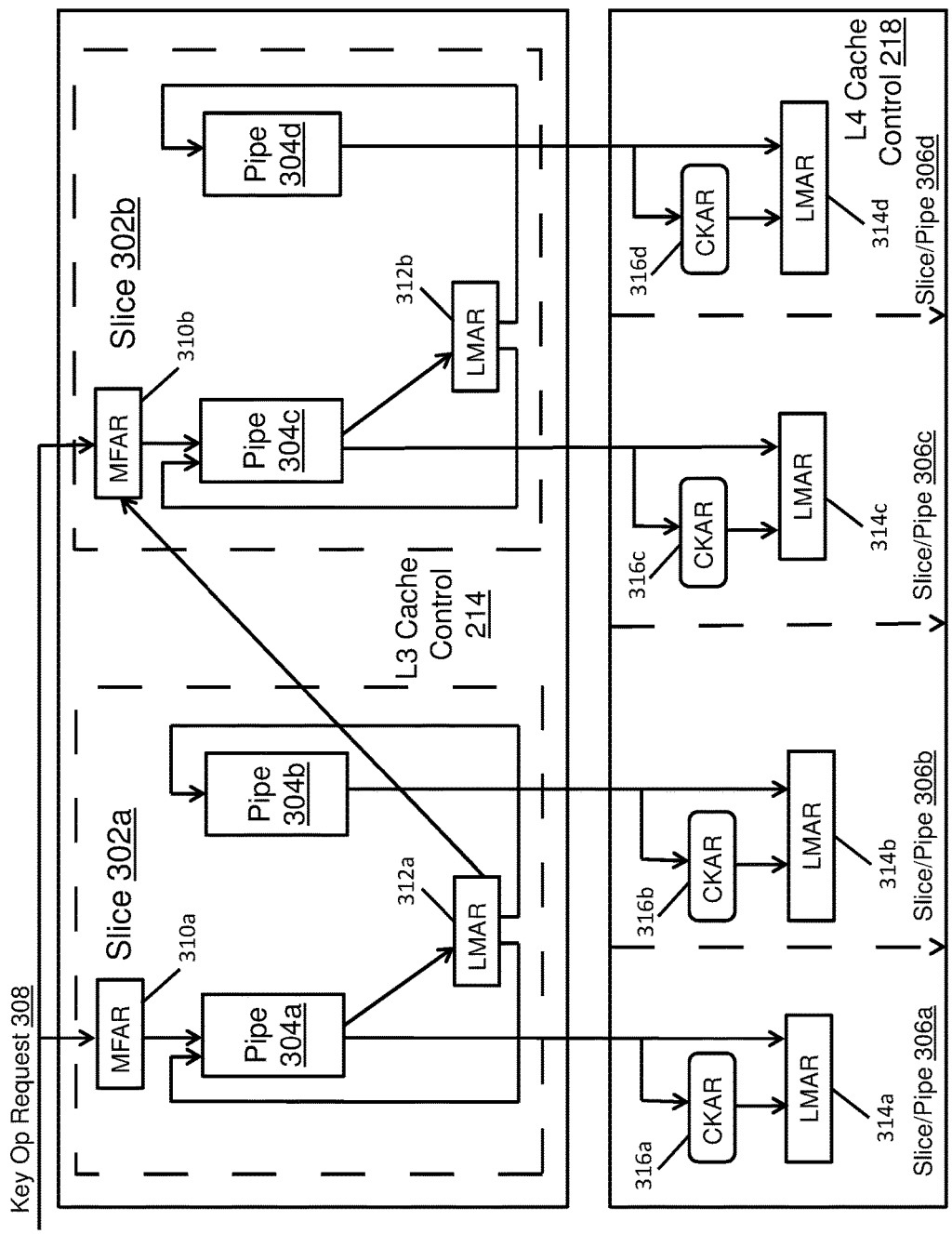
FIG. 3 depicts a key operation address flow according to one or more embodiments.

A slice-pipe relationship between the L3 cache control 214 and L4 cache control 218 is depicted in FIG. 3 in greater detail. In the example of FIG. 3, slice 302a in L3 cache control 214 includes pipe 304a and 304b, while slice 302b in L3 cache control 214 includes pipe 304c and 304d. An output of slice 302a and pipe 304a can be sent to slice/pipe 306a of the L4 cache control 218. Similarly, an output of slice 302a and pipe 304b can be sent to slice/pipe 306b of the L4 cache control 218. Outputs of slice 302b, pipes 304c and 304d can be sent respectively to slice/pipes 306c, 306d of L4 cache control 218. It should be understood that although in this embodiment the address is sliced in half and further partitioned into two pipes per slice, the invention concept can be expanded to any number of pipes within a slice, or any number of slices. A key operation request 308 can be sent to the L3 cache control 214 from core 202a of FIG. 2, for example, via L1 cache control 206a and L2 cache control 210a of FIG. 2. The key operation request 308 can be a multi-slice/pipe request that is dropped to slices 302a, 302b and ingated (e.g., latched) into millicode fetch address registers (MFAR) 310a, 310b. The MFAR 310a on slice 302a passes the key operation request 308 via pipe 304a of an L3 pipeline into a local millicode address register (LMAR) 312a utilized specifically for key operations requiring serialization. Once the MFAR 310a has loaded the LMAR 312a through pipe 304a, the MFAR 310b on slice 302b is allowed to make a pipe pass to load an LMAR 312b on slice 302b through pipe 304c. If no DMR operation is in progress, at this point both LMARs 312a, 312b are free to forward the key operation request 308 to the L4 cache control 218 in any order. Each LMAR 312a, 312b can make two pipe passes, one on each address-based pipe (pipes 304a, 304b for LMAR 312a and pipes 304c, 304d for LMAR 312b) to forward the key operation request 308 to the L4 cache controller 218 on the SC 106 of FIG. 2. The pipe passes can occur in either order or simultaneously. There is no need for the LMAR 312a, 312b to wait for a response to return for a first pipe request (e.g., from pipe 304a, 304c) before launching a second pipe request (e.g., to pipe 304b, 304d).

If a DMR operation happened to be in progress at the time of the LMAR 312a load, then a request from pipe 304a can be launched to the L4 cache control 218 and the remaining pipes 304b-30d can wait for an off-chip response to return for the request from pipe 304a before launching. This off-chip response can indicate whether or not the key operation request 308 is targeting the DMR address range. If it is, a DMR rejection can be returned. If a DMR rejection response is not returned, at that point it is safe for the LMAR 312a to release the other requests in pipes 304b-304d to the L4 cache control 218 and continue the key operation.

In order to ensure that key operations continue to be processed in same order across all pipes 304a-304d while operating in a window of time when the L3 cache control 214 is launching key operation requests 308 from the various pipes 304a-304d in any order, additional interlocks and logic can be included in the L4 cache control 218. In embodiments, slice/pipe 306a of L4 cache control 218 includes an LMAR 314a, slice/pipe 306b includes an LMAR 314b, slice/pipe 306c includes an LMAR 314c, and slice/pipe 306d includes an LMAR 314d. A chip key address register (CKAR) 316a can be used as a temporary holding place for the key operation request 308 from pipe 304a such that LMAR 314a can receive the key operation request 308 directly from the pipe 304a or time delayed through the CKAR 316a. Similarly, CKAR 316b provides a temporary hold location between pipe 304b and LMAR 314b. CKAR 316c provides a temporary hold location between pipe 304c and LMAR 314c. CKAR 316d provides a temporary hold location between pipe 304d and LMAR 314d. CKARs 316a-316d can each include space for one or more entries.

Figure 4:
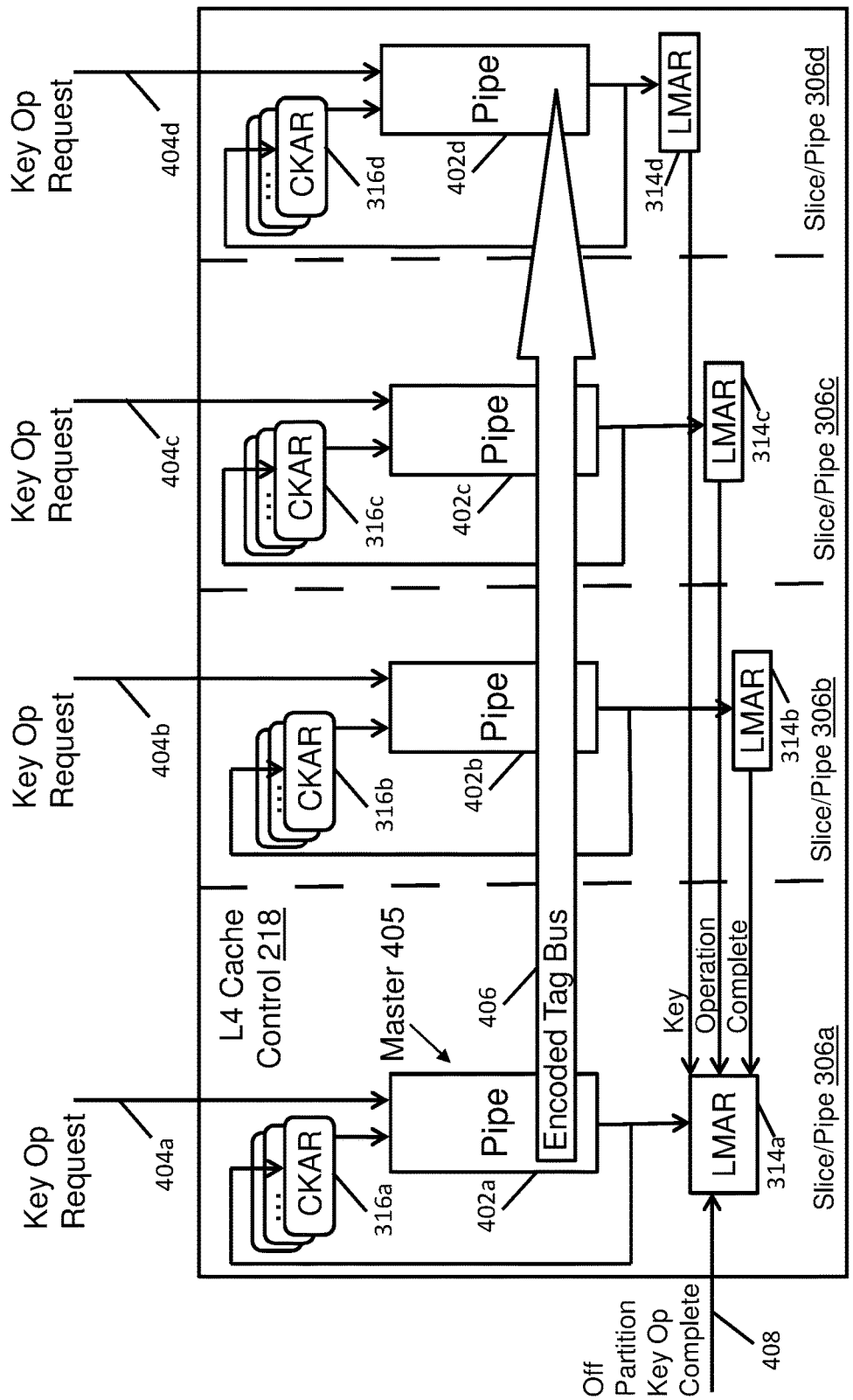
FIG. 4 depicts a key operation serialization control flow according to one or more embodiments.

A further example of the L4 cache control 218 is depicted in FIG. 4 as a key operation serialization control flow. A pipe 402a can be interposed between LMAR 314a and CKAR 316a. The pipe 402a can receive input from CKAR 316a and/or a key operation request 404a from pipe 304a of FIG. 3. Output of pipe 402a can be passed back to CKAR 316a and passed forward to LMAR 314a. Similarly, pipe 402b can be interposed between LMAR 314b and CKAR 316b. The pipe 402b can receive input from CKAR 316b and/or a key operation request 404b from pipe 304b of FIG. 3. Output of pipe 402b can be passed back to CKAR 316b and passed forward to LMAR 314b. Pipe 402c can be interposed between LMAR 314c and CKAR 316c. The pipe 402c can receive input from CKAR 316c and/or a key operation request 404c from pipe 304c of FIG. 3. Output of pipe 402c can be passed back to CKAR 316c and passed forward to LMAR 314c. Pipe 402d can be interposed between LMAR 314d and CKAR 316d. The pipe 402d can receive input from CKAR 316d and/or a key operation request 404d from pipe 304d of FIG. 3. Output of pipe 402d can be passed back to CKAR 316d and passed forward to LMAR 314d.

One of the pipes 402a-402d is designated as the master pipe 405 (e.g., pipe 402a of slice/pipe 306a) with the other pipes 402b-402d forced to process key operation requests 404b-404d in the same order as the master pipe 405. An encoded tag bus 406 can be used to continually broadcast to the other pipes 402b-402d an indication of which key operation, if any, is currently being processed in the LMAR 314a of the master pipe 405. The LMAR 314a monitors for key operation completion indications from LMAR 314b, 314c, 314d, as well as one or more off-partition key operation complete indications 408 (e.g., as received on communication fabric 110 from SCs 106b-106d, for instance). Although pipe 402a of slice/pipe 306a is designated as the master pipe 405 in the example of FIG. 4, the designation as a master pipe 405 can rotate between the pipes 402a-402d.

Figure 5:
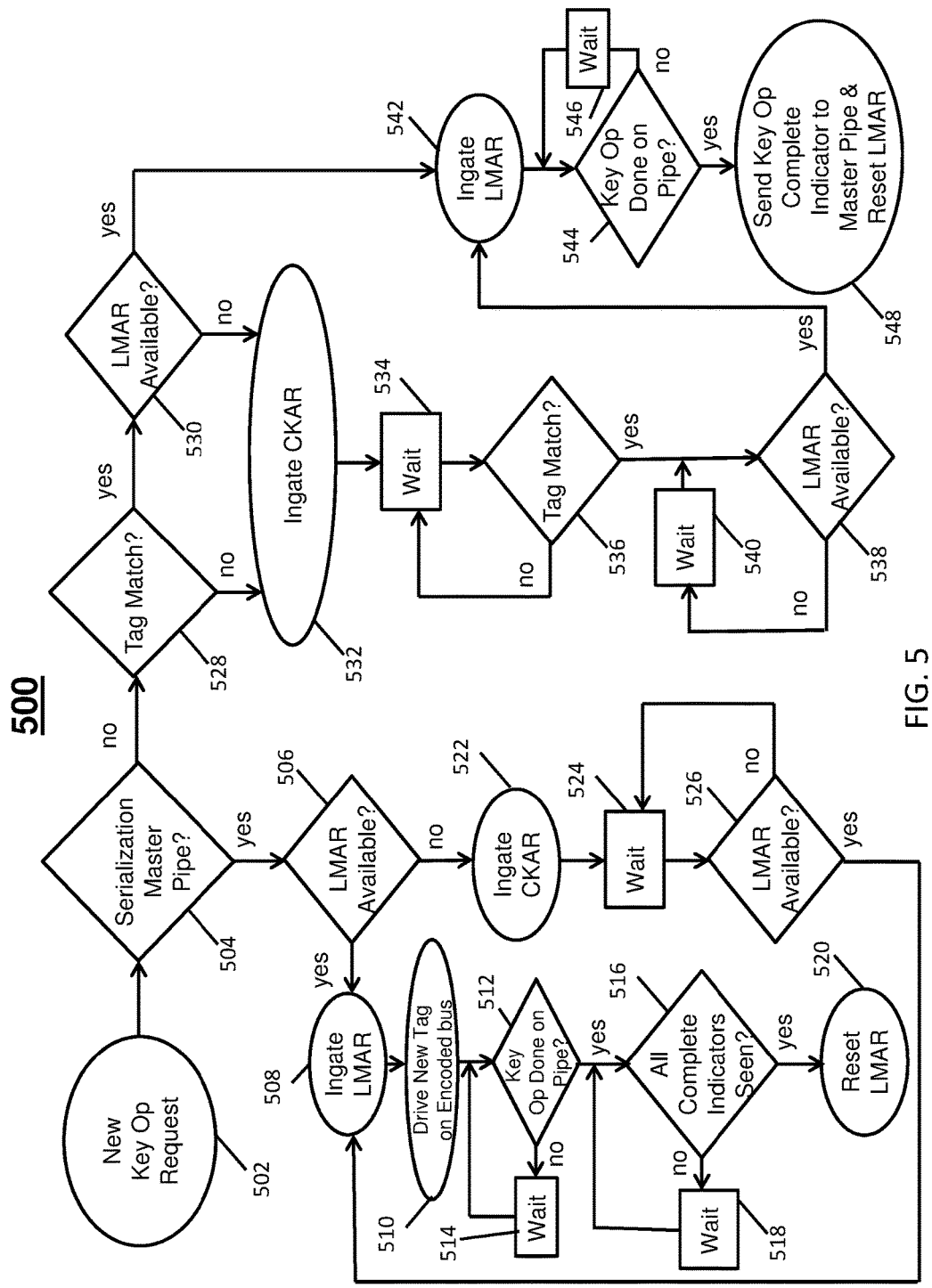
FIG. 5 depicts a key operation serialization logic flow according to one or more embodiments.

FIG. 5 depicts a key operation serialization logic flow 500 according to an embodiment and is described in reference to FIGS. 1-4. At block 502, a new key operation request is received, such as the key operation request 404a. FIG. 5 shows the flow of a key operation if it has been determined based on the absence of DMR operation activity or in response to another source, such as a software accessible serialization switch that can be activated while the system is running, that it is safe to allow the parallelization of all slice/pipe's key requests to be launched off the CP chip 104 to the SC 106 at once.

At block 504, a check for whether the operation is in the designated master pipe 405 is performed.

At block 506, if the operation is in the pipe designated as the Serialization Master (master pipe 405), a check for availability of LMAR 314a is performed. At block 508, if LMAR 314a is available, ingating of the key operation request 404a into LMAR 314a is performed. At block 510, a new tag is driven on to the encoded tag bus 406. At block 512, if a key operation is not done on the pipe 402a, then waiting is performed at block 514 until the key operation is done. At block 516, if the key operation is done on pipe 402a, a check of the key operation complete indications from LMAR 314b-314d can be performed along with checking for the off-partition key operation complete indication 408. At block 518, if the key operation completion indicators are not received, then waiting is performed until key operation completion indicators are received. At block 520, LMAR 314a can be reset once all key operation completion indicators are received, e.g., from LMARs 314b-314d. At block 522, if LMAR 314a was unavailable at block 506, the key operation request 404a can be ingated into CKAR 316a. At block 524, waiting is performed until LMAR 314a is available at block 526. Once LMAR 314a is available at block 526, ingating of LMAR 314a can be performed at block 508.

At block 528, if the pipe is not the designated Serialization Master pipe based on block 504, a tag match check is performed to determine whether a tag associated with a key operation matches a tag supplied by the master pipe 405 for pipes 402b-402d. At block 530, if there is a tag match, an availability check of an associated LMAR 314b-314d is performed. At block 532, if the associated LMAR 314b-314d is not available, ingating to the associated CKAR 316b-316d is performed to save an associated key operation request 404b-404d and tag. At block 534, waiting is performed until a tag match is identified at block 536. At block 538, if the associated LMAR 314b-314d is not available, then waiting is performed at block 540. At block 542, if the associated LMAR 314b-314d is available after either block 530 or 538, the associated LMAR 314b-314d is ingated. At block 544, if a key operation is not done on the associated pipe 402b-402d, waiting is performed at block 546. At block 548, if a key operation is done on the associated pipe 402b-402d, a key operation complete indicator is sent to the master pipe 405 and the associated LMAR 314b-314d is reset.

Figure 6:
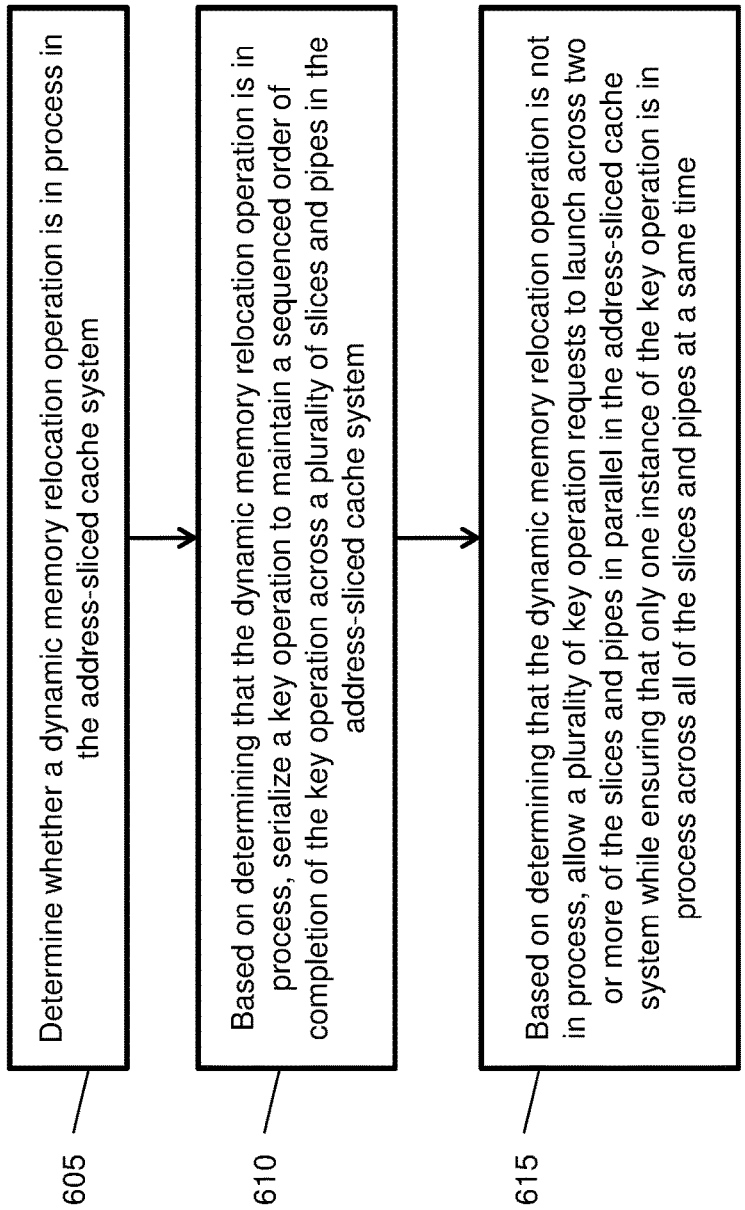
FIG. 6 depicts an example process flow for interlocking operations in an address-sliced cache system according to one or more embodiments.

Turning now to FIG. 6, a flow diagram of a process 600 for interlocking operations in the address-sliced cache system 100 of FIG. 1 is generally shown in accordance with an embodiment. The process 600 is described with reference to FIGS. 1-5 and may include additional steps beyond those depicted in FIG. 6.

At block 605, the address-sliced cache system 100 determines whether a DMR operation is in process in the address-sliced cache system 100. The determination can be performed by the L3 cache control 214 or the L4 cache control 218, for example. At block 610, based on determining that the DMR operation is in process, a key operation is serialized to maintain a sequenced order of completion of the key operation across a plurality of slices and pipes (e.g., slice/pipe 306a-306d) in the address-sliced cache system 100. The serialization may be performed regardless of DMR operation activity based on a switch override, such as a software switch. Determining whether the DMR operation is in process can include checking a target of a DMR address range and checking for a DMR rejection to determine when to release a key operation request such as key operation request 308.

At block 615, based on determining that the DMR operation is not in process, a plurality of key operation requests 404a-404d is allowed to launch across two or more of the slices and pipes (e.g., slice/pipes 306a-306d) in parallel in the address-sliced cache system 100 while ensuring that only one instance of the key operations is in process across all of the slices and pipes at a same time. The key operation requests 404a-404d can be launched from the slices and pipes of a first cache control (e.g., L3 cache control 214) to a second cache control (e.g., L4 cache control 218) in any order. A dedicated resource per port can be used at the second cache control to queue the key operation requests 404a-404d from the slices and pipes in parallel. For example, CKARs 316a-316d can be used to queue the key operation requests 404a-404d received at pipes 402a-402d.

Each of the slices 302a, 302b can include two of the pipes (e.g., pipes 304a, 304b and pipes 304c, 304d) at the first cache control (e.g., at L3 cache control 214), and each of the slices 302a, 302b at the first cache control can include a fetch address register (e.g., MFAR 310a, 310b) operable to pass one of the key operation requests (e.g., key operation request 308) through at least one of the pipes 304a-304d to a local address register (e.g., LMAR 312a, 312b) to support the serializing. One of the pipes 402a-402d in the second cache control (e.g., L4 cache control 218) can be identified as a master pipe 405. The key operation requests 404a-404d can be processed by the pipes 402a-402d in a same order as the master pipe 405 based on an indication from the master pipe 405 of a current instance of the key operation requests 404a-404d being processed (e.g., based on a tag broadcast on encoded tag bus 406).

Figure 7:
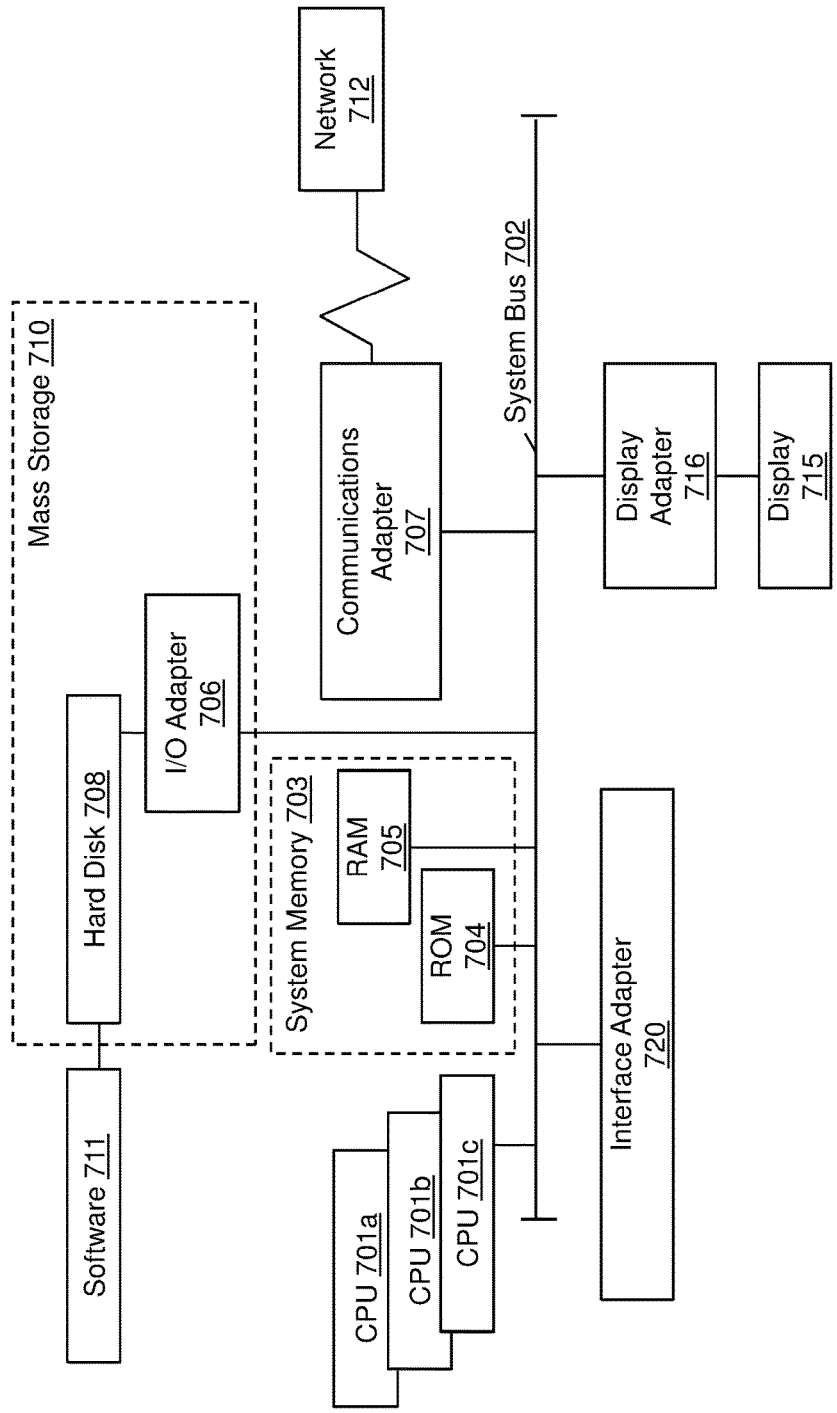
FIG. 7 depicts a processing system in accordance with one or more embodiments.

Referring now to FIG. 7, there is shown an embodiment of a processing system 700 for implementing the teachings herein. In this embodiment, the processing system 700 has one or more central processing units (processors) 701a, 701b, 701c, etc. (collectively or generically referred to as processor(s) 701) that can be an embodiment of the CP chips 104a-104x and/or other processing circuitry within the processing partitions 102a-102d of FIG. 1. The processors 701, also referred to as processing circuits/circuitry, are coupled via a system bus 702 to a system memory 703 and various other components (such as SC 106a-106d of FIG. 1). The system memory 703 can include read only memory (ROM) 704 and random access memory (RAM) 705. The ROM 704 is coupled to system bus 702 and may include a basic input/output system (BIOS), which controls certain basic functions of the processing system 700. RAM 705 is read-write memory coupled to system bus 702 for use by the processors 701.

FIG. 7 further depicts an input/output (I/O) adapter 706 and a communications adapter 707 coupled to the system bus 702. I/O adapter 706 may be a small computer system interface (SCSI) adapter that communicates with a hard disk 708 and/or any other similar component. I/O adapter 706 and hard disk 708 are collectively referred to herein as mass storage 710. Software 711 for execution on the processing system 700 may be stored in mass storage 710. The mass storage 710 is an example of a tangible storage medium readable by the processors 701, where the software 711 is stored as instructions for execution by the processors 701 to perform a method, such as the processes 500, 600 of FIGS. 5 and 6. Communications adapter 707 interconnects the system bus 702 with an outside network 712 enabling processing system 700 to communicate with other such systems. A display 715 is connected to system bus 702 via a display adapter 716, which may include a graphics controller to improve the performance of graphics intensive applications and a video controller. In one embodiment, adapters 706, 707, and 716 may be connected to one or more I/O buses that are connected to the system bus 702 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices can be connected to the system bus 702 via an interface adapter 720 and the display adapter 716. A keyboard, mouse, speaker can be interconnected to the system bus 702 via the interface adapter 720, which may include, for example, a Super I/O chip integrating multiple device adapters into a single integrated circuit.

Thus, as configured in FIG. 7, the processing system 700 includes processing capability in the form of processors 701, and, storage capability including the system memory 703 and the mass storage 710, input means such as keyboard and mouse, and output capability including speaker and the display 715. In one embodiment, a portion of the system memory 703 and the mass storage 710 collectively store an operating system, such as the z/OS or AIX operating system from IBM Corporation, to coordinate the functions of the various components shown in FIG. 7.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method for interlocking operations in an address-sliced cache system, the computer-implemented method comprising:
    determining whether a dynamic memory relocation operation is in process in the address-sliced cache system;
    based on determining that the dynamic memory relocation operation is in process, serializing a key operation to maintain a sequenced order of completion of the key operation across a plurality of slices and pipes in the address-sliced cache system; and
    based on determining that the dynamic memory relocation operation is not in process, allowing a plurality of key operation requests to launch in parallel across two or more of the plurality of slices and pipes in parallel in the address-sliced cache system while ensuring that only one instance of the key operation is in process across all of the plurality of slices and pipes at a same time by launching the plurality of key operation requests from the plurality of slices and pipes of a first cache control to a second cache control, using a dedicated resource per port at the second cache control to queue the plurality of key operation requests in parallel from the plurality of slices and pipes in parallel, identifying one pipe of the plurality of slices and pipes in the second cache control as a master pipe, and processing the plurality of key operation requests by pipes of the plurality of slices and pipes in a same order as the master pipe based on an indication broadcast on an encoded tag bus from the master pipe of a current instance of the plurality of key operation requests being processed.

2. The computer-implemented method of claim 1, wherein each of the slices comprises two pipes of the plurality of slices and pipes at the first cache control, and each of the slices at the first cache control comprises a fetch address register operable to pass one of the plurality of key operation requests through at least one pipe of the plurality of slices and pipes to a local address register to support the serializing.

3. The computer-implemented method of claim 1, wherein
    determining whether the dynamic memory relocation operation is in process comprises checking a target of a dynamic memory relocation address range, and checking for a dynamic memory relocation rejection to determine when to release the plurality of key operation requests.

4. The computer-implemented method of claim 1, further comprising performing the serializing regardless of dynamic memory relocation operation activity based on a switch override.

5. A system for interlocking operations in an address-sliced cache system comprising:

a plurality of computer processor chips; and a system controller coupled to the plurality of computer processor chips, wherein the system controller is configured to:

determine whether a dynamic memory relocation operation is in process;

based on determining that the dynamic memory relocation operation is in process, serialize a key operation to maintain a sequenced order of completion of the key operation across a plurality of slices and pipes in the address-sliced cache system; and based on determining that the dynamic memory relocation operation is not in process, allow a plurality of key operation requests to launch in parallel across two or more of the plurality of slices and pipes in parallel in the address-sliced cache system while ensuring that only one instance of the key operations is in process across all of the plurality of slices and pipes at a same time by launching the plurality of key operation requests from the plurality of slices and pipes of a first cache control to a second cache control, using a dedicated resource per port at the second cache control to queue the plurality of key operation requests in parallel from the plurality of slices and pipes in parallel, identifying one pipe of the plurality of slices and pipes in the second cache control as a master pipe, and processing the plurality of key operation requests by pipes of the plurality of slices and pipes in a same order as the master pipe based on an indication broadcast on an encoded tag bus from the master pipe of a current instance of the plurality of key operation requests being processed.

6. The system of claim 5, wherein each of the slices comprises two pipes of the plurality of slices and pipes at the first cache control, and each of the slices at the first cache control comprises a fetch address register operable to pass one of the plurality of key operation requests through at least one pipe of the plurality of slices and pipes to a local address register to support serialization.

7. The system of claim 5, wherein determining whether the dynamic memory relocation operation is in process comprises checking a target of a dynamic memory relocation address range, and checking for a dynamic memory relocation rejection to determine when to release the plurality of key operation requests.

8. A computer program product for interlocking operations in an address-sliced cache system, the computer program product comprising a computer readable storage medium having program instructions embodied therewith, the program instructions executable by processing circuitry to cause the processing circuitry to perform:

determining whether a dynamic memory relocation operation is in process in the address-sliced cache system;

based on determining that the dynamic memory relocation operation is in process, serializing a key operation to maintain a sequenced order of completion of the key operation across a plurality of slices and pipes in the address-sliced cache system; and based on determining that the dynamic memory relocation operation is not in process, allowing a plurality of key operation requests to launch in parallel across two or more of the plurality of slices and pipes in parallel in the address-sliced cache system while ensuring that only one instance of the key operations is in process across all of the plurality of slices and pipes at a same time by launching the plurality of key operation requests from the plurality of slices and pipes of a first cache control to a second cache control, using a dedicated resource per port at the second cache control to queue the plurality of key operation requests in parallel from the plurality of slices and pipes in parallel, identifying one pipe of the plurality of slices and pipes in the second cache control as a master pipe, and processing the plurality of key operation requests by pipes of the plurality of slices and pipes in a same order as the master pipe based on an indication broadcast on an encoded tag bus from the master pipe of a current instance of the plurality of key operation requests being processed.

9. The computer program product of claim 8, wherein each of the slices comprises two pipes of the plurality of slices and pipes at the first cache control, and each of the slices at the first cache control comprises a fetch address register operable to pass one of the plurality of key operation requests through at least one pipe of the plurality of slices and pipes to a local address register to support the serializing.

10. The computer program product of claim 8, wherein determining whether the dynamic memory relocation operation is in process comprises checking a target of a dynamic memory relocation address range, and checking for a dynamic memory relocation rejection to determine when to release the plurality of key operation requests.

11. The computer program product of claim 8, wherein the program instructions executable by processing circuitry further cause the processing circuitry to perform the serializing regardless of dynamic memory relocation operation activity based on a switch override.

\* \* \* \* \*